(No Model.)
W. M. JEWELL.
FILTER.
No. 577,686. Patented Feb. 23, 1897.
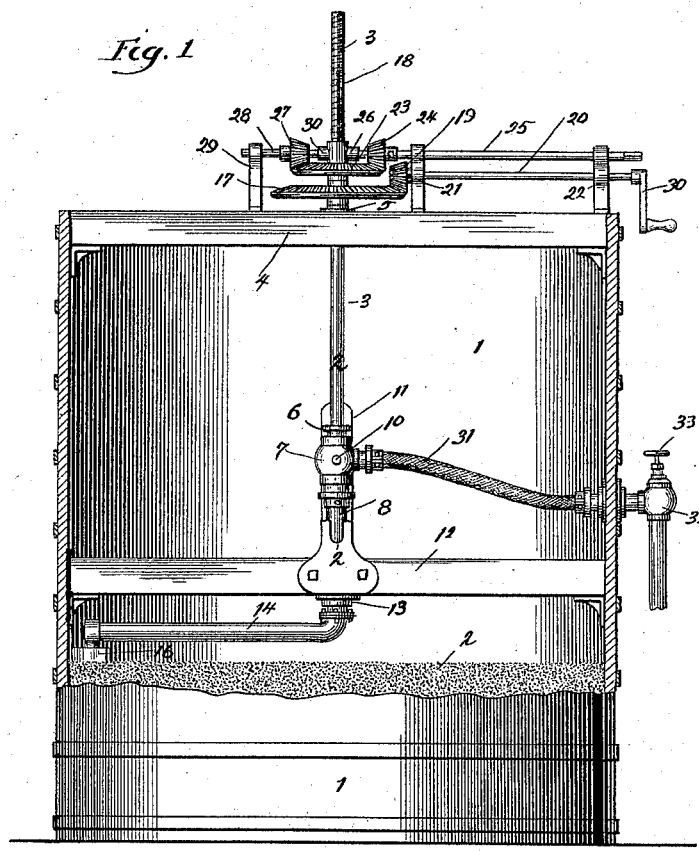
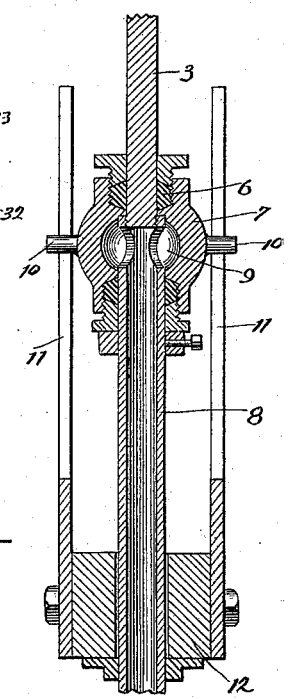
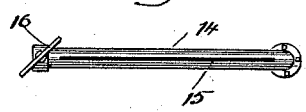
Witnesses:
Nellie McKibben
Julia M. Bristol
Inventor:
William M. Jewell
By Bond Adams Pickard
Attorneys

UNITED STATES PATENT OFFICE.

WILLIAM M. JEWELL, OF CHICAGO, ILLINOIS, ASSIGNOR TO THE O. H. JEWELL FILTER COMPANY, OF SAME PLACE.

FILTER.

SPECIFICATION forming part of Letters Patent No. 577,686, dated February 23, 1897.

Application filed May 9, 1892. Serial No. 432,304. (No model.)

*To all whom it may concern:*

Be it known that I, WILLIAM M. JEWELL, a citizen of the United States, residing at Chicago, in the county of Cook and State of Illinois, have invented certain new and useful Improvements in Filters, of which the following is a specification, reference being had to the accompanying drawings, in which—

Figure 1 is a partial vertical section through the filter-tank. Fig. 2 is an enlarged detail, being a vertical section of a part of the vertical shaft on line 2 2 of Fig. 1; and Fig. 3 is a bottom view of the horizontal pipe.

My invention relates to filters, and particularly to mechanism for purifying the filter-bed.

The object of my invention is to provide new and improved mechanism for removing the impurities at the upper surface of the filter-bed of a quartz filter by removing the impurities alone or the upper strata of sand or other material of which the filter-bed is composed. As described in my former application, Serial No. 428,226, filed April 7, 1892, the greater part of the impurities which are taken from the water collect either upon the surface of the filter-bed or near the upper surface of the bed, and by removing the impurities and the impure sand the filter-bed may be used for a much greater length of time without the entire bed being washed.

In my application above referred to the impurities accumulating upon the upper surface of the filter-bed are removed by suction, and with the apparatus shown in said application the impurities may be siphoned off together with a portion of the supernatant liquid with which the impurities are mixed. The method set forth in my present application contemplates the removal of the impurities from the surface of the filter-bed, with a small portion of the filtering material, by pressure and without suction, the pressure in the form of apparatus shown being derived from the head of water in the filter-tank.

My improved form of apparatus shown in the present application is designed particularly for use in putting the above-mentioned process into operation, but it may also be used to siphon off the impurities should the water in the tank become so low as to leave a portion of the offcarrying-pipes above the water-line.

The objects of my invention I accomplish as hereinafter specified and as illustrated in the drawings.

That which I regard as new will be pointed out in the claims.

In the drawings, 1 indicates the filter-tank, in which is a filter-bed 2, of quartz or other suitable filtering material. Mounted in a vertical position centrally of the tank 1 is a shaft 3, which is supported by a cross-bar 4 or other suitable device, and is adapted to rotate in suitable bearings 5. The lower end of the shaft terminates a short distance above the filter-bed 2 and extends into a stuffing-box 6.

7 indicates a coupling, the casing of which connects the shaft 3 with a tubular shaft 8, the tubular shaft 8 extending upward and terminating in the coupling-chamber 9, as best shown in Fig. 2, which chamber is so located as to be under the water-line under ordinary conditions. The upper end of the shaft 8 is screwed to the lower end of the shaft 3, as shown in Fig. 2, the arrangement being such that by rotating the shaft 3 the tubular shaft 8 may also be rotated. The coupling 7 is prevented from rotating by means of pins 10, which move in vertical slots formed in guide-bars 11, suitably secured at each side of the coupling, as best shown in Fig. 2. The lower ends of the bars 11 are secured to a cross-bar 12 or other suitable device. The lower end of the shaft 8 is mounted in suitable bearings 13, supported by the cross-bar 12, or in any other suitable manner.

14 indicates a tube which is connected at one end to the lower end of the tubular shaft 8, as best shown in Fig. 1. The tube 14 is a little shorter than the radius of the tank 1, as shown in Fig. 1, and extends from the center to the circumference of the filter-bed 2.

15 indicates a slot which is formed in the under surface of the tube 14 and extends longitudinally thereof, as shown in Fig. 3.

16 indicates a scraper which is secured to the outer end of the tube 14 and is carried in an inclined position to adapt it to scrape the sand from the outer edge of the tank 1 toward the center of the tank.

17 indicates a bevel-gear which is mounted upon the upper end of the shaft 3 on a feather 18, as best shown in Fig. 1.

19 indicates a bevel-pinion which is mounted upon one end of a shaft 20, mounted in suitable bearings 21 and 22, which pinion 19 intermeshes with the wheel 17, as shown. By this construction by rotating the shaft 20 the shafts 3 and 8 may be rotated, thereby moving the tube 14 over the surface of the filter-bed.

23 indicates a screw-threaded bevel-gear which is mounted upon screw-threads on the shaft 3.

24 indicates a bevel-pinion which is mounted upon a shaft 25 and intermeshes with the wheel 23. By this construction when the shaft 25 is rotated the bevel-gear 23 will also be rotated, thereby moving the shaft 3 up or down and causing the tube 14 to recede from or approach the surface of the filter-bed.

The inner end of the shaft 25 is mounted in a suitable bearing 26, fitted loosely over the shaft 3.

27 indicates an idler-pinion which is mounted upon a shaft 28, journaled in suitable bearings 29 and 30 at the opposite side of the shaft 3 from the shaft 25. The pinion 27 serves to balance the wheel 23 and makes the action of the shaft 3 much smoother.

30 indicates a crank which may be fitted upon either of the shafts 20 or 25 for rotating them.

31 indicates a pipe which extends from the chamber 9 of the coupling 7 through a suitable opening ordinarily below the water-line in the side of the tank 1 to a pipe 32 for carrying the sand or impurities from the filter. The pipe 32 is preferably provided with a valve 33.

The operation of my improved apparatus is as follows: To remove the accumulated impurities, the shaft 25 is rotated in the proper direction and the shafts 3 and 8 thereby moved downward until the tube 14 lies close to the filter-bed. The pipe 31 is made flexible to permit of such vertical movement. By the pressure of the head of water in the tank the impurities are caused to pass upward through the slot 15 into the tube 14, and are thence carried through the shaft 8 into the coupling 7, whence they pass through the pipe 31 to the pipe 32. The shaft 3 is at this time rotated by rotating the shaft 20, thereby moving the tube 14 over the surface of the filter-bed and removing the upper stratum to an equal depth all over the surface of the bed, thereby leaving a clean and level surface exposed. If it is desired to remove a second layer, the shaft 3 may be lowered again and the above-described operation repeated; or if it is not desired to remove any more sand shaft 3 may be raised by reversing the rotation of the gear 23. These operations may take place without interrupting the process of filtration.

It is evident that two or more horizontal tubes 14 may be used, if desired, as it would not change the operation of the apparatus; and instead of a single slot 15 in the tube 14 a number of slots may be used, or the tube may be otherwise perforated to permit the sand or impurities to flow into the tube. The construction shown, however, is that which I prefer.

That which I claim as my invention, and desire to secure by Letters Patent, is—

1. The combination with a filter-tank, and filter-bed, of a horizontal tube centrally pivoted in said tank above the filter-bed in close proximity thereto, and extending from the center to the circumference of the filter-bed, so that by rotating said tube about its pivot it may be moved over the entire surface of the filtering material, mechanism for rotating said tube, said tube being open on its under side so that the impurities accumulated upon the surface of the filter-bed may flow thereinto, and piping for conveying the impurities from said tube to the outside of the filter, substantially as described.

2. The combination with a filter-tank containing filtering material, of a vertical shaft 3, a tubular shaft 8 connected with the vertical shaft, a coupling-chamber 9 communicating with the tubular shaft, a pipe 31 communicating with the coupling-chamber and extending to the outside of the filter-tank, a horizontal tube 14 extending from the center to the circumference of the tank, movable over the surface of the filtering material without agitating the same and provided in its under side with an opening which permits the impurities accumulated upon the surface of the filtering material to flow thereinto, and means for rotating the shafts and tube, substantially as described.

3. The combination with a filter-tank containing filtering material, of a vertical shaft 3, a tubular shaft 8 connected with the vertical shaft, a coupling-chamber 9 communicating with the tubular shaft, a flexible pipe 31 communicating with the coupling-chamber and extending to the outside of the filter-tank, a horizontal tube 14 movable over the surface of the filtering material without agitating the latter and provided in its under side with an opening which permits the impurities accumulated upon the surface of the filtering material to flow thereinto, and means for rotating the shafts and tube and raising and lowering the same in a vertical plane, substantially as described.

4. The combination with a tank, and a granular filter-bed therein, of a shaft arranged vertically therein, means for moving said shaft vertically and for rotating it, a horizontal tube connected to said shaft, and extending from the center to the circumference of the filter-bed, said tube being arranged over the filter-bed and being open at its under side to permit impurities to flow thereinto, and means for conducting the impurities from said tube to the exterior of said tank, substantially as described.

5. The combination with a tank, and a granular filter-bed therein, of a shaft arranged vertically therein, means for moving said shaft vertically and for rotating it, a horizontal tube connected to said shaft, said tube extending from the center to the circumference of the filter-bed and being arranged over the filter-bed and having a longitudinal slot in its under side to permit impurities to flow thereinto, and means for conducting impurities from said tube to the exterior of the tank, substantially as described.

WILLIAM M. JEWELL.

Witnesses:
ALBERT H. ADAMS,
JOHN L. JACKSON.